United States Patent Office 3,156,725
Patented Nov. 10, 1964

3,156,725
SUBSTITUTED 2-PHENOXY AND PHENYLTHIO-
CYCLOPROPYLAMINES
Carl Kaiser, Haddon Heights, N.J., and Richard J. Mohrbacher, Fort Washington, Pa., assignors to Smith Kline & French Laboratories, Philadelphia, Pa., a corporation of Pennsylvania
No Drawing. Filed Apr. 18, 1962, Ser. No. 188,557
7 Claims. (Cl. 260—570.5)

This invention relates to novel substituted 2-phenoxy and phenylthiocyclopropylamines having valuable therapeutic utility. More specifically, these compounds alter or modify the central nervous system and are useful as ataractic, antidepressant and hypotensive agents.

This application is a continuation in part of application Serial No. 853,452, filed November 17, 1959, and now abandoned.

The novel substituted cyclopropylamines of this invention are represented by the following general formula:

FORMULA I

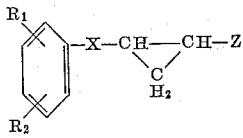

when:

X represents oxygen and sulfur,
$R_1$ and $R_2$ represent hydrogen, lower alkyl, halogen, amino, nitro, lower alkoxy or trifluoromethyl,
Z represents amino, monomethylamino or dimethylamino.

Advantageous compounds of this invention are represented by the above structural formula when:

$R_1$ represents hydrogen,
$R_2$ represents chlorine, bromine or trifluoromethyl.

The compound of this invention which is particularly advantageous is 2-phenoxycyclopropylamine.

This invention also includes nontoxic pharmaceutically acceptable addition salts of the above defined bases formed with organic and inorganic acids. Such salts are easily prepared by methods known to the art. The base is reacted with either the stoichiometric amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzenesulfonic and theophylline acetic acids as well as with the 8-halotheophyllines for example, 8-chlorotheophylline and 8-bromotheophylline. Exemplary of such inorganic sales are those with hydrochloric, hydrobromic, sulfuric, sulfamic, phosphoric and nitric acids. These salts may also be prepared by the classical method of double decomposition of appropriate salts which is well-known to the art.

The compounds of this invention may be present as cis-trans isomers due to the geometrical arrangement of the substituted phenyl and amino moieties with respect to the cyclopropane ring and further as $d$, $l$ optical isomers. Unless otherwise specified in the specification and the accompanying claims, it is intended to include in this invention all isomers, particularly the separated cis or trans isomers and the resolved $d$- and $l$- cis or $d$- and $l$- trans isomers, as well as the cis-trans mixtures of these isomers.

The novel substituted cyclopropylamines of this invention are prepared according to the following synthetic scheme:

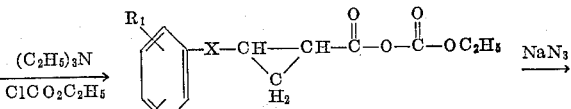

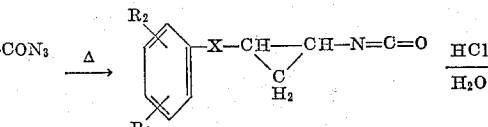

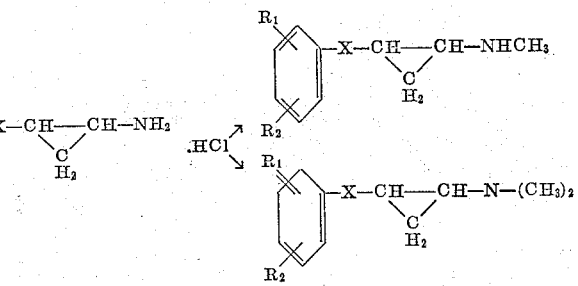

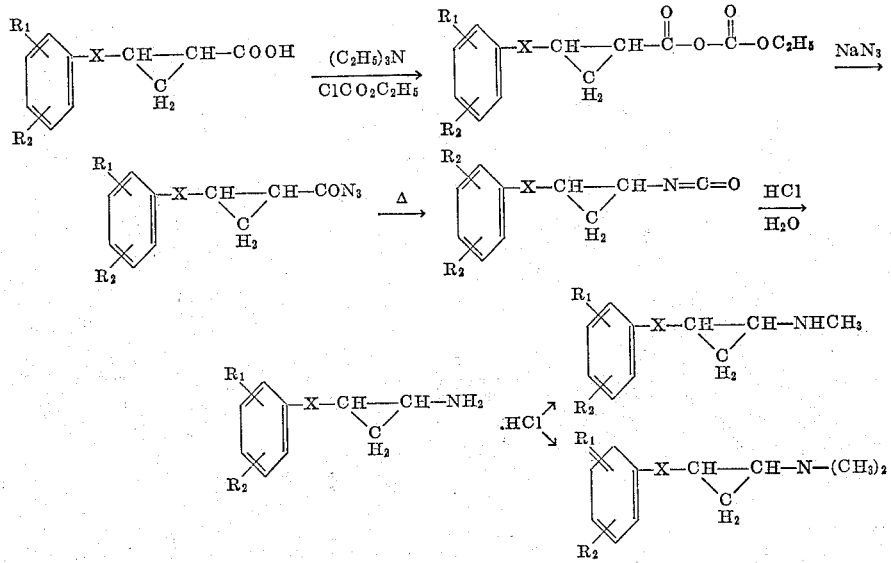

This method is carried out using readily available starting materials and gives excellent yields of the end product. Where certain compounds desired for use as starting materials are not available they can be prepared by methods described in the literature and well-known to the art. For example, the phenylthiocyclopropanecarboxylic acid can be prepared by reacting phenylvinyl sulfide with ethyl diazoacetate and the resulting ethyl 2-phenylthiocyclopropane carboxylate is hydrolyzed to the carboxylic acid. The following general procedure is used to prepare the novel substituted cyclopropylamines of this invention.

The properly substituted cyclopropanecarboxylic acid is suspended in water and a sufficient amount of a water soluble organic solvent, preferably acetone, is added to complete the solution. The solution is cooled to about 0° C. to 20° C. and treated with ethyl chlorocarbonate in the presence of a trialkylamine such as triethylamine to form the mixed anhydride. The mixed anhydride is then converted to the azide by treatment with sodium azide and the resulting azide is thermally decomposed by refluxing in an unreactive organic solvent, for example toluene, to yield the isocyanate. Hydrolysis of the isocyanate by refluxing in concentrated hydrochloric acid solution yields 2-substituted phenoxy or phenylthiocyclopropylamine hydrochloride. To obtain the free base the hydrochloride in an aqueous solution is neutralized with alkali, the solution extracted with for example ether, the extract evaporated in vacuo and the base purified by careful distillation at low temperatures and reduced pressures. The free base is then converted to other acid addition salts as outlined above.

The N-monomethyl derivatives of the 2-substituted cyclopropylamines are prepared by refluxing the primary amine with ethyl formate to yield N-formyl-2-substituted phenoxy or phenylthiocyclopropylamine. The N-formyl-2-substituted cyclopropylamine is then refluxed with sodium hydride and methyl iodide in diethyleneglycol dimethyl ether yielding N-methyl-N-formyl-2-phenoxy or phenylthiocycloproplyamine which upon hydrolysis by refluxing in hydrochloric acid yields N-methyl-2-phenoxy or phenylthiocyclopropylamine. The dimethylamino derivatives are obtained by methylation of the primary amine with a mixture of aqueous formaldehyde and formic acid.

It will be readily apparent to one skilled in the art that variations of these procedures are possible. The preferably preparative procedures are the methods discussed above, most advantageously, conversion of the substituted cyclopropanecarboxylic acids to the intermediate azides and rearrangement of the azides to the substituted cyclopropylamines.

The following examples are not limiting but are illustrative of compounds of this invention and the procedures for their preparation.

Example 1

2-phenoxycyclopropanecarboxylic acid (12.1 g.) is suspended in 15 ml. of water and 40 ml. of acetone is added to complete the solution. The solution is cooled to 0° C. and 10.1 g. of triethylamine in 190 ml. of acetone is added. While the temperature is maintained at 0° C. a solution of 10.8 g. of ethyl chlorocarbonate in 45 ml. of acetone is slowly added. The mixture is stirred for 30 minutes at 0° C. and then a solution of 10.3 g. of sodium azide in 30 ml. of water is added dropwise and the stirring is continued for one hour at the conclusion of which the mixture is poured into an excess of ice water. The oil which separates is extracted with ether and the combined ether extracts are dried with anhydrous magnesium sulfate. The solvent is removed in vacuo to leave the oily azide which is dissolved in 100 ml. of anhydrous toluene. The toluene solution is heated on a steam bath until the evolution of nitrogen is complete and is then evaporated in vacuo to leave the isocyanate as a red oil. The isocyanate is suspended in 240 ml. of 20% aqueous hydrochloric acid and the mixture is refluxed and stirred for four hours. The resulting solution is concentrated in vacuo to give a crystalline residue. Recrystallization from isopropanol-ether yields colorless crystalline 2-phenoxycyclopropylamine hydrochloride with a melting point of 179–181° C.

The free base is liberated from the above hydrochloride salt by treating an aqueous solution of the salt with 40% sodium hydroxide solution and making the solution strongly alkaline. The oil which separates is extracted with ether and the combined ether extracts are dried with anhydrous magnesium sulfate. Removal of the solvent under reduced pressure yields yellow oily 2-phenoxycyclopropylamine.

Example 2

A solution of 14.9 g. of 2-phenoxycyclopropylamine (as prepared in Example 1) and 100 ml. of ethyl formate is refluxed for 17 hours. The excess ethyl formate is evaporated in vacuo to leave a crystalline residue of N-formyl-2-phenoxycyclopropylamine.

To a stirred solution of 17.7 g. of N-formyl-2-phenoxycyclopropylamine in 150 ml. of diethyleneglycol dimethyl ether is added 5.2 g. of a 54.5% suspension of sodium hydride in mineral oil. The mixture is refluxed for two hours, then cooled and an additional 5.2 g. of the sodium hydride dispersion is added. Refluxing is continued for two hours, the mixture is cooled and 67 ml. of methyl iodide is added. The mixture is allowed to stand for 16 hours at room temperature, an acetone-Dry Ice condenser is attached and the mixture is refluxed for 8 hours. The mixture is allowed to stand an additional 72 hours at room temperature, 20 ml. of methyl iodide is added and the mixture is refluxed for 4 hours again using an acetone-Dry Ice condenser. The mixture is filtered and the filtrate is concentrated to 75 ml. in vacuo. The residual liquid is poured into one liter of ice water and the precipitated oil is extracted with methylene chloride. The combined extracts are dried with anhydrous magnesium sulfate and the solvent is removed in vacuo. The residual oil is distilled in vacuo to yield N-methyl-N-formyl-2-phenoxycyclopropylamine.

A mixture of 8.6 g. of N-methyl-N-formyl-2-phenoxycyclopropylamine and 100 ml. of 37% hydrochloric acid is refluxed and stirred for 20 hours. The mixture is extracted with ether and the aqueous portion is concentrated in vacuo. The crystalline residue is dissolved in 200 ml. of water and the solution is extracted with ether. The aqueous fraction is made strongly alkaline with 40% sodium hydroxide solution. The precipitated oil is extracted with ether. The ether extracts are dried with anhydrous magnesium sulfate and the solvent removed in vacuo to leave 2-phenoxycyclopropylmethylamine as a pale yellow oil.

The maleate salt is prepared by dissolving the amine in isopropanol and reacting this with an ethyl acetate solution of maleic acid.

Example 3

A 40% aqueous solution of formaldehyde (5.1 g.) is added to a cooled solution of 3.0 g. of 2-phenoxycyclopropylamine (as prepared in Example 1) in 6.6 g. of 90% formic acid and the mixture is refluxed for 18 hours. The cooled reaction mixture is treated with 2.7 ml. of concentrated hydrochloric acid and the solution evaporated in vacuo. The residue is made alkaline with 50% potassium hydroxide solution and the solution is extracted with ether. The dried ether extracts are evaporated to give the residual 2-phenoxycyclopropyldimethylamine.

An ethereal solution of the free base is treated with ethereal hydrogen chloride to yield the hydrochloride salt.

Example 4

Phenylvinyl sulfide (46.24 g.) and 42.6 g. of ethyldiazoacetate are mixed in an ice bath. A portion of this mixture (¼ amount) is stirred and heated in an oil bath until the internal temperature reaches 160° C. The remainder of the mixture is then added dropwise and the heating is continued for four hours keeping the internal temperature at 150–160° C. The reaction mixture is then fractionated obtaining ethyl 2-phenylthiocyclopropanecarboxylate as a yellow oil.

A mixture of 32.7 g. of ethyl 2-phenylthiocyclopropanecarboxylate and 175 ml. of ethanol and a solution of 18.4 g. of sodium hydroxide in 25 ml. of water is refluxed for approximately 8 hours. The mixture is concentrated in vacuo and the residue dissolved in water, extracted with ether and the aqueous solution is acidified with concentrated hydrochloric acid. The precipitate is extracted with ether and the ether evaporated to yield 2-phenylthiocyclopropanecarboxylic acid.

2-phenylthiocyclopropanecarboxylic acid (13.3 g.) is suspended in 15 ml. of water and 40 ml. of acetone is added to complete the solution. The solution is cooled to 0° C. and 10.1 g. of triethylamine in 190 ml. of acetone is added. While the temperature is maintained at 0° C. a solution of 10.8 g. of ethyl chlorocarbonate in 45 ml. of acetone is slowly added. The mixture is stirred for 30 minutes at 0° C. and then a solution of 10.3 g. of sodium azide in 30 ml. of water is added dropwise and the stirring is continued for one hour at the conclusion of which the mixture is poured into an excess of ice water. The oil which separates is extracted with ether and the combined ether extracts are dried with anhydrous magnesium sulfate. The solvent is removed in vacuo to leave the oily azide which is dissolved in 100 ml. of anhydrous toluene. The toluene solution is heated on a steam bath until the evolution of nitrogen is complete and is then evaporated in vacuo to leave the isocyanate as a red oil. The isocyanate is suspended in 240 ml. of 20% aqueous hydrochloric acid and the mixture is refluxed and stirred for four hours. The resulting solution is concentrated in vacuo to give a crystalline residue. Recrystallization from isopropanolether yields colorless crystalline 2-phenylthiocyclopropylamine hydrochloride with a melting point of 186.5–188.5° C.

The free base is liberated from the above hydrochloride salt by treating an aqueous solution of the salt with 40% sodium hydroxide solution and making the solution strongly alkaline. The oil which separates is extracted with ether and the combined ether extracts are dried with anhydrous magnesium sulfate. Removal of the solvent under reduced pressure yields yellow oily 2-phenylthiocyclopropylamine.

*Example 5*

A solution of 16.3 g. of 2-phenylthiocyclopropylamine (as prepared in Example 4) and 100 ml. of ethyl formate is refluxed for 17 hours. The excess ethyl formate is evaporated in vacuo to leave a crystalline residue of N-formyl-2-phenylthiocyclopropylamine.

To a stirred solution of 17.7 g. of N-formyl-2-phenylthiocyclopropylamine in 150 ml. of diethyleneglycol dimethyl ether is added 5.2 g. of a 54.5% suspension of sodium hydride in mineral oil. The mixture is refluxed for two hours, then cooled and an additional 5.2 g. of the sodium hydride dispersion is added. Refluxing is continued for two hours, the mixture is cooled and 67 ml. of methyl iodide is added. The mixture is allowed to stand for 16 hours at room temperature, an acetone-Dry Ice condenser is attached and the mixture is refluxed for 8 hours. The mixture is allowed to stand an additional 72 hours at room temperature, 20 ml. of methyl iodide is added and the mixture is refluxed for 4 hours again using an acetone-Dry Ice condenser. The mixture is filtered and the filtrate is concentrated to 75 ml. in vacuo. The residual liquid is poured into one liter of ice water and the precipitated oil is extracted with methylene chloride. The combined extracts are dried with anhydrous magnesium sulfate and the solvent is removed in vacuo. The residual oil is distilled in vacuo to yield N-methyl-N-formyl-2-phenylthiocyclopropylamine.

A mixture of 8.6 g. of N-methyl-N-formyl-2-phenylthiocyclopropylamine and 100 ml. of 37% hydrochloric acid is refluxed and stirred for 20 hours. The mixture is extracted with ether and the aqueous portion is concentrated in vacuo. The crystalline residue is dissolved in 200 ml. of water and the solution is extracted with ether. The aqueous fraction is made strongly alkaline with 40% sodium hydroxide solution. The precipitated oil is extracted with ether. The ether extracts are dried with anhydrous magnesium sulfate and the solvent removed in vacuo to leave 2-phenylthiocyclopropylmethylamine as a pale yellow oil.

The maleate salt is prepared by dissolving the amine in isopropanol and reacting this with an ethyl acetate solution of maleic acid.

*Example 6*

A 40% aqueous solution of formaldehyde (5.1 g.) is added to a cooled solution of 3.6 g. of 2-phenylthiocyclopropylamine (as prepared in Example 4) in 6.6 g. of 90% formic acid and the mixture is refluxed for 18 hours. The cooled reaction mixture is treated with 2.7 ml. of concentrated hydrochloric acid and the solution evaporated in vacuo. The residue is made alkaline with 50% potassium hydroxide solution and the solution is extracted with ether. The dried ether extracts are evaporated to give the residual 2-phenylthiocyclopropyldimethylamine.

An ethereal solution of the free base is treated with ethereal hydrogen chloride to yield the hydrochloride salt.

*Example 7*

To a solution of 28.9 g. of 2-(3-chlorophenoxy)cyclopropanecarboxylic acid in water and acetone which has been cooled to 5° C. is added a solution of 20.2 g. of triethylamine in acetone. The temperature is maintained at 5° C. and a solution of 21.6 g. of ethyl chlorocarbonate in acetone is slowly added. The mixture is stirred for 45 minutes at 5° C. and an aqueous solution containing 20.6 g. of sodium azide is added dropwise and the stirring is continued for one hour. The mixture is then poured into an excess of ice water and the oil which separates is extracted with ether and the combined ether extracts are dried with anhydrous magnesium sulfate. The solvent is evaporated in vacuo to yield the oily azide which is dissolved in anhydrous toluene. The toluene solution is heated with the complete removal of nitrogen and is then evaporated in vacuo to yield the isocyanate as a red oil. The isocyanate is refluxed and stirred with aqueous hydrochloric acid and the resulting solution is concentrated in vacuo to give a crystalline residue. The residue is dissolved in water and the solution is made strongly alkaline by the addition of 40% sodium hydroxide solution. The oil which separates is extracted with ether and the combined ether extracts are dried with anhydrous magnesium sulfate. Removal of the solvent under reduced pressure leaves oily 2-(3-chlorophenoxy)-cyclopropylamine.

The free base is converted to the succinate salt by reacting it in ether with a saturated ethereal solution of succinic acid.

*Example 8*

An aqueous solution of formaldehyde (10.2 g.) is added to a cooled solution of 7.3 g. of 2-(3-chlorophenoxy)cyclopropylamine (as prepared in Example 7) in 12 g. of 90% formic acid and the mixture is refluxed for 18 hours. The cooled reaction mixture is treated with 5.0 ml. of concentrated hydrochloric acid and the solution evaporated in vacuo. The residue is made alkaline with 50% potassium hydroxide solution and the solution is extracted with ether. The dried ether extracts are evaporated to give the residual 2-(chlorophenoxy)cyclopropyldimethylamine.

An ethereal solution of the free base is treated with glycolic acid to yield the glycolate salt.

*Example 9*

To an aqueous acetone solution of 51.4 g. of 2-(4-bromophenoxy)cyclopropanecarboxylic acid which has been cooled to 0° C. is added an acetone solution containing 30.3 g. of triethylamine. The temperature is maintained at 0° C. and a solution of 32.4 g. of ethyl chlorocarbonate in acetone is slowly added. The mixture is stirred at 0° C. and an aqueous solution containing 30.9 g. of sodium azide is added dropwise and the stirring is continued. The mixture is poured into an excess of ice water and the separated oil is extracted with ether.

The combined ether extracts are dried with anhydrous magnesium sulfate and the solvent is evaporated in vacuo to leave the oily azide which is dissolved in anhydrous toluene. The toluene solution is heated with the removal of nitrogen and is then evaporated in vacuo to yield the isocyanate as a mobile red liquid. The isocyanate is stirred and refluxed and the resulting solution is evaporated in vacuo to give a semi-solid residue. This residue is dissolved in water and the solution is made strongly alkaline by the addition of 40% sodium hydroxide solution. The separated oil is extracted with ether and the combined extracts are dried with anhydrous magnesium sulfate. The solvent is removed under reduced pressure to yield 2-(4-bromophenoxy)cyclopropylamine as an oil.

The oily primary amine obtained above is dissolved in ethyl acetate and reacted with an ethyl acetate solution of tartaric acid to yield the tartrate salt.

*Example 10*

2 - (4 - methoxyphenoxy)cyclopropanecarboxylic acid (7.0 g.) is suspended in water and sufficient acetone is added to complete the solution. The solution is cooled to 10° C. and 5.0 g. of triethylamine in acetone is added. The temperature is maintained at 10° C. and a solution of 5.4 g. of ethyl chlorocarbonate dissolved in acetone is slowly added. The mixture is stirred for 25 minutes at 10° C. and 5.1 g. of sodium azide is aqueous solution is added dropwise. The stirring is continued for one hour and the mixture is poured into an excess of ice water. The oil which separates is extracted with ether and the combined ether extracts are dried with anhydrous magnesium sulfate. The solvent is removed in vacuo to yield the azide as an oil. The azide is dissolved in toluene and heated on a steam bath with the complete evolution of nitrogen and the solution is then evaporated in vacuo to yield the isocyanate as a red oil. The isocyanate is suspended in aqueous hydrochloric acid and the mixture is refluxed and stirred for four hours. The resulting solution is concentrated in vacuo to give a crystalline residue which is dissolved in water and made alkaline with sodium hydroxide solution. An ether extraction is made on the oil which separates and the combined extracts are dried with anhydrous magnesium sulfate. Removal of the solvent under reduced pressure leaves 2-(4-methoxyphenoxy)cyclopropylamine.

*Example 11*

To 51.8 g. of 2-(4-methylphenoxy)cyclopropanecarboxylic acid in an aqueous acetone solution which has been cooled to 0° C. is added 40.4 of triethylamine in acetone. While the temperature is maintained at 0° C. a solution of 43.2 g. of ethyl chlorocarbonate in acetone is slowly added. The mixture is stirred and then an aqueous solution of 41.2 g. of sodium azide is added dropwise. The mixture is stirred at 0° C. and then poured into an excess of ice water. The oil which separates is extracted with ether and the combined extracts are dried with anhydrous magnesium sulfate. The solvent is removed in vacuo and the resultant oily azide is dissolved in toluene and heated on a steam bath until the evolution of nitrogen is completed. The toluene is removed in vacuo yielding the isocyanate as a mobile red liquid. The isocyanate is refluxed with hydrochloric acid and the resulting solution is evaporated to give a semi-solid residue. The residue is dissolved in water and the solution made alkaline by the addition of sodium hydroxide solution. The separated oil is extracted with ether and the extracts are dried with anhydrous magnesium sulfate. The solvent is removed under reduced pressure to yield 2-(4-methylphenoxy)cyclopropylamine as an oil.

A solution of the base in ether is treated with glacial acetic acid to give the acetate salt.

*Example 12*

A mixture of 81.1 g. of 4-trifluoromethylphenol, 69 g. of potassium carbonate, 83 g. of potassium iodide, 40.2 g. of ethylene chlorohydrin and 400 ml. of acetone is heated at reflux temperature for 24 hours. The mixture is cooled and sufficient water is added to dissolve the inorganic salts. The organic layer is removed and the aqueous phase is extracted with ether. The combined organic solutions are washed with 5% solution of sodium hydroxide and dried with anhydrous magnesium sulfate. The ether is removed and the residual yellow oil is distilled at reduced pressure to give colorless 2-(4-trifluoromethylphenoxy) ethanol.

A solution of 20.6 g.of 2-(4-trifluoromethylphenoxy) ethanol in 75 ml. of acetic anhydride is heated under reflux for two hours. The excess acetic anhydride is removed under reduced pressure and the residual oil is diluted with 200 ml. of water and the mixture is extracted with ether. The ether extracts are washed with a saturated saline solution and then dried with anhydrous magnesium sulfate. The solvent is removed in vacuo and the residual 2-(4-trifluoromethylphenoxy) ethanol acetate is distilled under reduced pressure to yield the product as a colorless liquid.

A cylindrical column is packed with glass helices and the column is placed in a vertical position and heated to 460° C. while a slow stream of nitrogen is introduced. 2-(4-trifluoromethylphenoxy) ethanol acetate (24.8 g.) is slowly dropped through the column while maintaining an internal temperature of 460° C. The vapors are collected in a cooled flask equpipped with an acetone-Dry Ice condenser. Upon completion of the ethanol acetate addition, the column is flushed with 5 ml. of anhydrous benzene. The total product collected in the flask is diluted with 200 ml. of water and the mixture is extracted with ether. The combined ether extracts are washed with 5% sodium carbonate solution and the ethereal solution is dried and evaporated at atmospheric pressure. To the oily rseidue is added 0.2 g. of 4-t-butylcatechol and distillation at reduced pressure gives 4-trifluoromethylphenyl vinyl ether as a colorless oil.

4-trifluoromethylphenyl vinyl ether (31.9 g.) and 35.0 g. of ethyl diazoacetate are mixed at 0° C. and the mixture is gradually heated to 150° C. The reaction is maintained at 150° C. for three hours and the mixture is then distilled under reduced pressure. The main fraction which consists of ethyl 2-(4-trifluoromethylphenoxy)cyclopropanecarboxylate is collected.

A solution of 11.5 g. of potassium hydroxide in 12 ml. of water and 50 ml. of 95% ethanol is added to 17.6 g. of ethyl 2-(4-trifluoromethylphenoxy)cyclopropanecarboxylate. The solution is refluxed for four hours. The solvents are removed in vacuo to give a solid residue. The residue is dissolved in water and the solution adjusted to pH 1 with concentrated hydrochloric acid to give a precipitate. The filtered solid is recrystallized from water to give 2-(4-trifluoromethylphenoxy) cyclopropanecarboxylic acid.

A mixture of 42 g. of 2-(4-trifluoromethylphenoxy)-cyclopropanecarboxylic acid, 25.2 g. of triethylamine and 27.0 g. of ethyl chlorocarbonate in aqueous acetone is stirred for 45 minutes at 0° C. A solution of 25.7 g. of sodium azide in 60 ml. of water is added dropwise. The mixture is stirred for one hour at 0° C. and then poured into an excess of ice water. The separated oil is extracted with ether and the extracts are dried and the solvent removed in vacuo to yield an azide. The azide is dissolved in toluene, heated on a steam bath and the toluene is removed in vacuo to leave the isocyanate as a red oil. The isocyanate is refluxed with 20% aqueous hydrochloric acid for 3 hours and the resulting solution is evaporated in vacuo to give a semi-solid residue. This residue is dissolved in water and made alkaline with sodium hydroxide solution. The separated oil is extracted with ether and the combined extracts are dried and the solvent removed under reduced pressure. The resulting product is 2-(4-trifluoromethylphenoxy)cyclopropylamine.

The amine is taken up in isopropanol and an ethereal hydrogen chloride solution is added to yield the hydrochloride salt.

Example 13

A mixture of 5.1 g. of 2-(4-nitrophenoxy)cyclopropanecarboxylic acid, 3.4 g. of triethylamine and 3.6 g. of ethyl chlorocarbonate in aqueous acetone is stirred for 30 minutes at 5° C. A solution of 3.4 g. of sodium azide in water is added dropwise and stirring is continued for 45 minutes. The mixture is poured into an excess of ice water and the separated oil is extracted with ether. The ether extracts are dried and the solvent removed in vacuo to leave the azide as an oil. A toluene solution of the azide is heated on a steam bath and the toluene is then removed in vacuo to yield the isocyanate as a red oil. The isocyanate is refluxed with hydrochloric acid and the resulting solution is evaporated in vacuo to give a semisolid residue which is dissolved in water and made alkaline with sodium hydroxide solution. The oil is separated and extracted with ether and the combined extracts are dried and the solvent is removed under reduced pressure to yield 2-(4-nitrophenoxy)cyclopropylamine.

Treating a solution of the free base in ethyl acetate with benzoic acid gives the benzoate salt.

Example 14

2-(4-nitrophenoxy)cyclopropylamine (19.5 g.) (as prepared in Example 13) is dissolved in 100 ml. of ethanol. To this solution is added 100 mg. of platinum oxide and hydrogenation is accomplished at a pressure of 50 pounds per square inch at room temperature. Upon completion of the hydrogen absorption the platinum is filtered off and the solution is concentrated under reduced pressure. The amine is taken up in isopropanol and an ethereal hydrogen chloride solution is added to yield 2-(4-aminophenoxy)cyclopropylamine dihydrochloride.

Example 15

2-(2,4-dichlorophenoxy)cyclopropanecarboxylic acid (84.3 g.) is suspended in water and sufficient acetone is added to complete the solution. The solution is cooled to 0° C. and a solution containing 50.5 g. of triethylamine and 54.0 g. of ethylchlorocarbonate in acetone is slowly added. The mixture is stirred at 0° C. and a solution containing 51.5 g. of sodium azide in water is added dropwise while stirring is continued. The mixture is poured into ice water, the oil separated and ether extracted, the extracts are dried and the solvent is removed in vacuo. The resultant azide is dissolved in toluene, heated on a steam bath and then the toluene is removed in vacuo to yield the isocyanate. The isocyanate is hydrolyzed by refluxing with hydrochloric acid and the resultant residue received after evaporation of the solution is made strongly alkaline. The separated oil is ether extracted, the extracts are dried and the solvent is removed under reduced pressure to give 2-(2,4-dichlorophenoxy)cyclopropylamine.

A sample of the free base in ether solution is treated with an excess of hydrogen bromide to yield the hydrobromide salt.

Example 16

A mixture of 92.2 g. of 2-(2-methyl-4-chlorophenoxy)-cyclopropanecarboxylic acid, 60.6 g. of triethylamine and 64.8 g. of ethylchlorocarbonate in aqueous acetone is stirred at 5° C. A solution of 61.8 g. of sodium azide in water is added dropwise while stirring is continued. The mixture is poured into ice water, the oil separated and ether extracted, extracts are dried and the solvent is removed in vacuo. The resultant azide is dissolved in toluene, heated on a steam bath and then the toluene is removed in vacuo to yield the isocyanate. The isocyanate is hydrolyzed by refluxing with hydrochloric acid and the resultant residue received after evaporation of the solution is made strongly alkaline. The separated oil is ether extracted, the extracts are dried and the solvent is removed under reduced pressure to give 2-(2-methyl-4-chlorophenoxy)cyclopropylamine.

Example 17

2-(2-methoxy-4-chlorophenoxy)cyclopropanecarboxylic acid (115.4 g.) is suspended in water and sufficient acetone is added to complete the solution. The solution is cooled to 0° C. and a solution containing 70.7 g. of triethylamine and 75.6 g. of ethyl chlorocarbonate in acetone is slowly added. The mixture is stirred at 0° C. and a solution containing 72.1 g. of sodium azide in water is added dropwise while stirring is continued The mixture is poured into ice water, the oil separated and ether extracted, the extracts are dried and the solvent is removed in vacuo. The resultant azide is dissolved in toluene, heated on a steam bath and the toluene is removed in vacuo to yield the isocyanate. The isocyanate is refluxed with 20% hydrochloric acid and the resultant residue received after evaporation of the solution is made strongly alkaline. The oil is separated, extracted with ether, the extracts are dried and the solvent is removed under reduced pressure to yield 2-(2-methoxy-4-chlorophenoxy)-cyclopropylamine.

A solution of the free base in ethyl acetate is treated with lactic acid to yield the lactate salt.

Example 18

To a cooled solution of 7.6 g. of 2-(4-trifluoromethylphenoxy)cyclopropylamine (as prepared in Example 12) in 17.7 g. of 90% formic acid, is added 13.7 g. of 40% aqueous formaldehyde solution and the mixture heated at reflux for 18 hours. The cooled reaction mixture is treated with 7.5 ml. of concentrated hydrochloric acid and the solution evaporated in vacuo. The residue is made alkaline with 50% potassium hydroxide solution and the free base extracted with ether. The dried ether extracts are distilled to yield 2-(4-trifluoromethylphenoxy)cyclopropyldimethylamine.

The free base is treated with citric acid in an acetone solution to give the citrate salt.

Example 19

A mixture of 106.1 g. of 2-(4-fluorophenoxy)cyclopropanecarboxylic acid, 80.8 g. of triethylamine and 86.4 g. of ethyl chlorocarbonate in acetone is stirred at 0° C. A solution of 82.4 g. of sodium azide in water is added dropwise while stirring is continued. The mixture is poured into ice water, the oil is separated and ether extracted, the extracts are dried and the solvent is removed in vacuo. The oily azide is dissolved in toluene heated on a steam bath and the toluene is removed in vacuo to yield the isocyanate. The isocyanate is refluxed with hydrochloric acid and the resultant residue received after evaporation of the solution is made strongly alkaline. The oil is separated and extracted with ether, the extracts are dried and the solvent is removed under reduced pressure to yield 2-(4-flourophenoxy)cylclopropylamine.

Example 20

2-(4-iodophenoxy)cyclopropanecarboxylic acid (30.5 g). is suspended in water and sufficient acetone is added to complete the solution. The solution is cooled to 0° C. and a solution contaniing 15.0 g. of triethylamine and 15.4 g. of ethyl chlorocarbonate in acetone is slowly added. The mixture is stirred at 0° C. and a solution containing 15.1 g. of sodium azide in water is added dropwise while stirring is continued. The mixture is poured into ice water, the oil separated and ether extracted, the extracts are dried and the solvent is removed in vacuo. The resultant azide is dissolved in toluene, heated on a steam bath and then the toluene is removed in vacuo to yield the isocyanate. The isocyanate is hydrolyzed by refluxing with hydrochloric acid and the resultant residue received after evaporation of the solution is made strongly alkaline. The separated oil is ether extracted, the extracts are dried and the solvent is removed under reduced pressure to yield 2-(4-iodophenoxy)cyclopropylamine.

A sample of the free base in ether solution is treated with glutamic acid to give the glutamate.

What is claimed is:

1. Chemical compound of the class consisting of a free base and its nontoxic pharameutically acceptable acid addition salts, said free base having the formula:

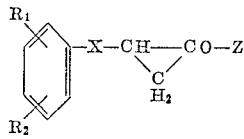

in which:

X is a member selected from the group consisting of oxygen and sulfur,

Z is a member selected from the group consisting of amino, monomethylamino and dimethylamino, and;

$R_1$ and $R_2$ are members selected from the group consisting of hydrogen, lower alkyl, halogen, amino, nitro, lower alkoxy and trifluoromethyl.

2. A chemical compound having the structural formula:

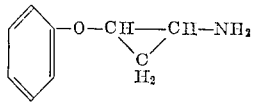

3. A chemical compound having the structural formula:

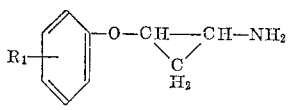

wherein $R_1$ is halogen.

4. A chemical compound having the structural formula:

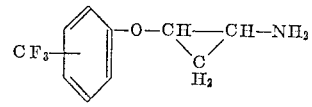

5. A chemical compound having the structural formula:

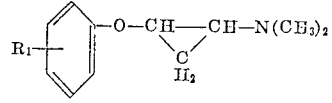

in which $R_1$ is halogen.

6. A chemical compound having the structural formula:

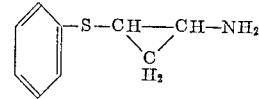

7. A chemical compound having the structural formula:

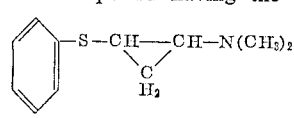

References Cited in the file of this patent

UNITED STATES PATENTS

| | | |
|---|---|---|
| 2,133,779 | Clifford | Oct. 18, 1938 |
| 2,997,422 | Tedeschi | Aug. 22, 1961 |

FOREIGN PATENTS

| | | |
|---|---|---|
| 662,591 | Great Britain | Dec. 15, 1951 |

UNITED STATES PATENT OFFICE
CERTIFICATE OF CORRECTION

Patent No. 3,156,725                        November 10, 1964

Carl Kaiser et al.

It is hereby certified that error appears in the above numbered patent requiring correction and that the said Letters Patent should read as corrected below.

Column 11, lines 8 to 13, the formula should appear as shown below instead of as in the patent:

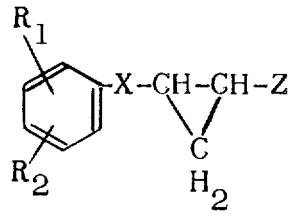

Signed and sealed this 30th day of March 1965.

(SEAL)
Attest:

ERNEST W. SWIDER                            EDWARD J. BRENNER
Attesting Officer                                Commissioner of Patents